Patented Apr. 28, 1936

2,039,099

UNITED STATES PATENT OFFICE 2,039,099

FLUID FLOW CONTROL

Henry J. Mastenbrook, Cleveland, Ohio, assignor to The Swartwout Company, Cleveland, Ohio, a corporation of Ohio Application December 21, 1929, Serial No. 415,714

13 Claims. (Cl. 50—10)

This invention has to do with the flow of fluids and is more particularly concerned with such mechanism as is employed to control fluids flowing under pressure.

For example the installation of extensive heating systems sometimes gives rise to the need for a plurality of sources of steam supply. When such is the case the several sources of supply are connected to a common header from which steam is taken as required to heat any or all of several units which may be connected to the header.

The present invention evidences recognition of the need for supplying safety cut-off valves in an arrangement such as above noted. The invention therefore has in view the provision of a cut-off valve which is automatically operable to close the line in which it is placed when the pressure of the fluid in the line on either side of the valve falls below a certain predetermined point. In accordance with this invention one of these valves will be located in each supply line adjacent to its point of connection with the header. With this arrangement a break in the line between the valve and source of steam, or any other factor tending to reduce the pressure of the steam below a certain point, will be effective to automatically shut the valve of that particular supply line while a reduction of pressure in the header would cause the closing of all the cut-off valves, unless, of course, cut-off valves are spaced along the header between supply lines.

Inasmuch as systems of this type are usually designed to operate with the steam therein at a certain pressure, and in view of the fact that a plurality of separate sources of supply might provide steam at varying pressures, reducing valves are employed to reduce the pressure of the steam in the several supply lines to that desired in the header. Having this condition in mind this invention broadly contemplates incorporating the functions of a reducing valve into the safety cut-off valve hereinbefore mentioned. A valve mechanism provided in accordance with this invention will constitute not only a cut-off valve for closing a line upon the drop of pressure on either side of the valve but also a valve for reducing the pressure of fluid as it flows therethrough.

Figure 1:
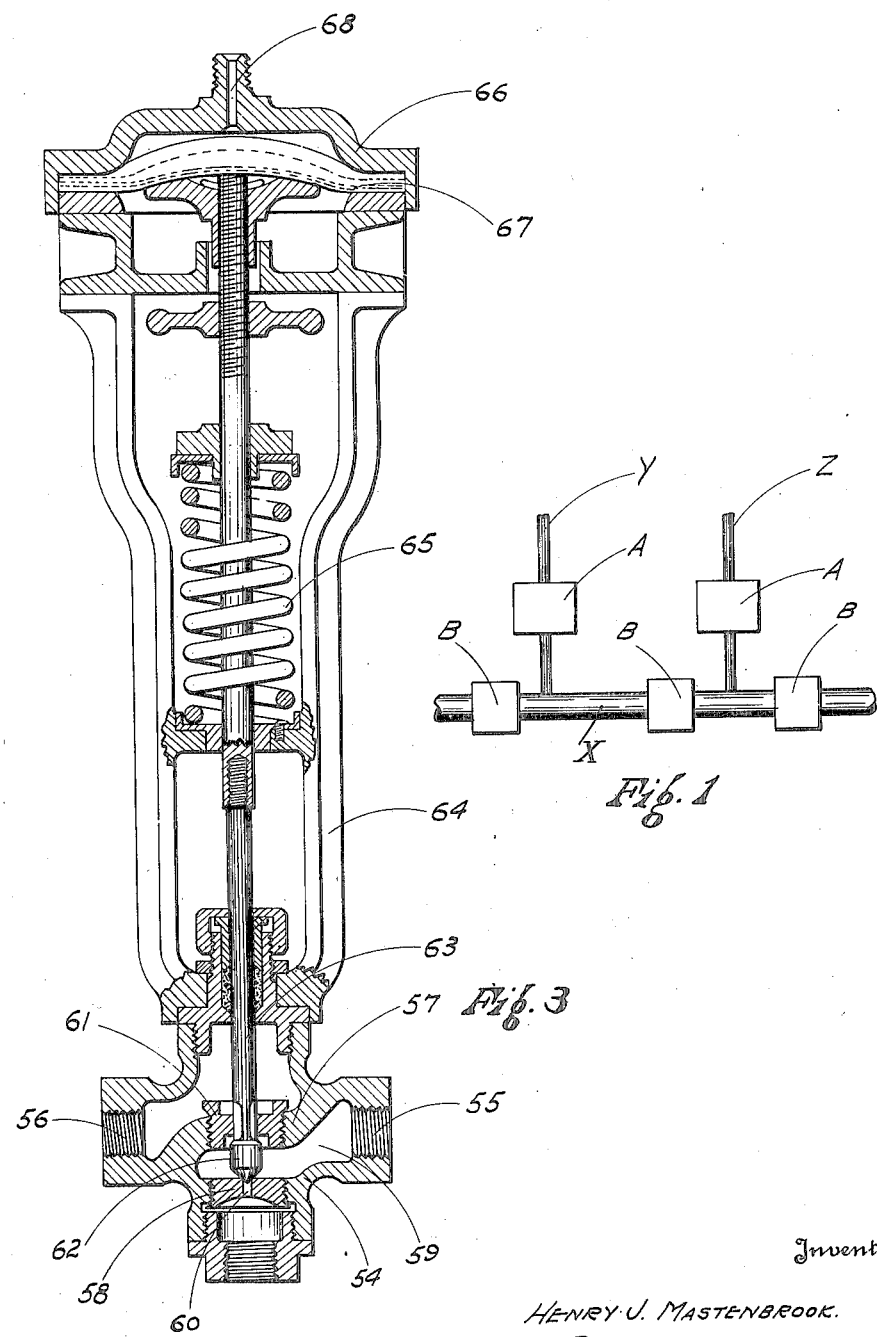
Figure 2:
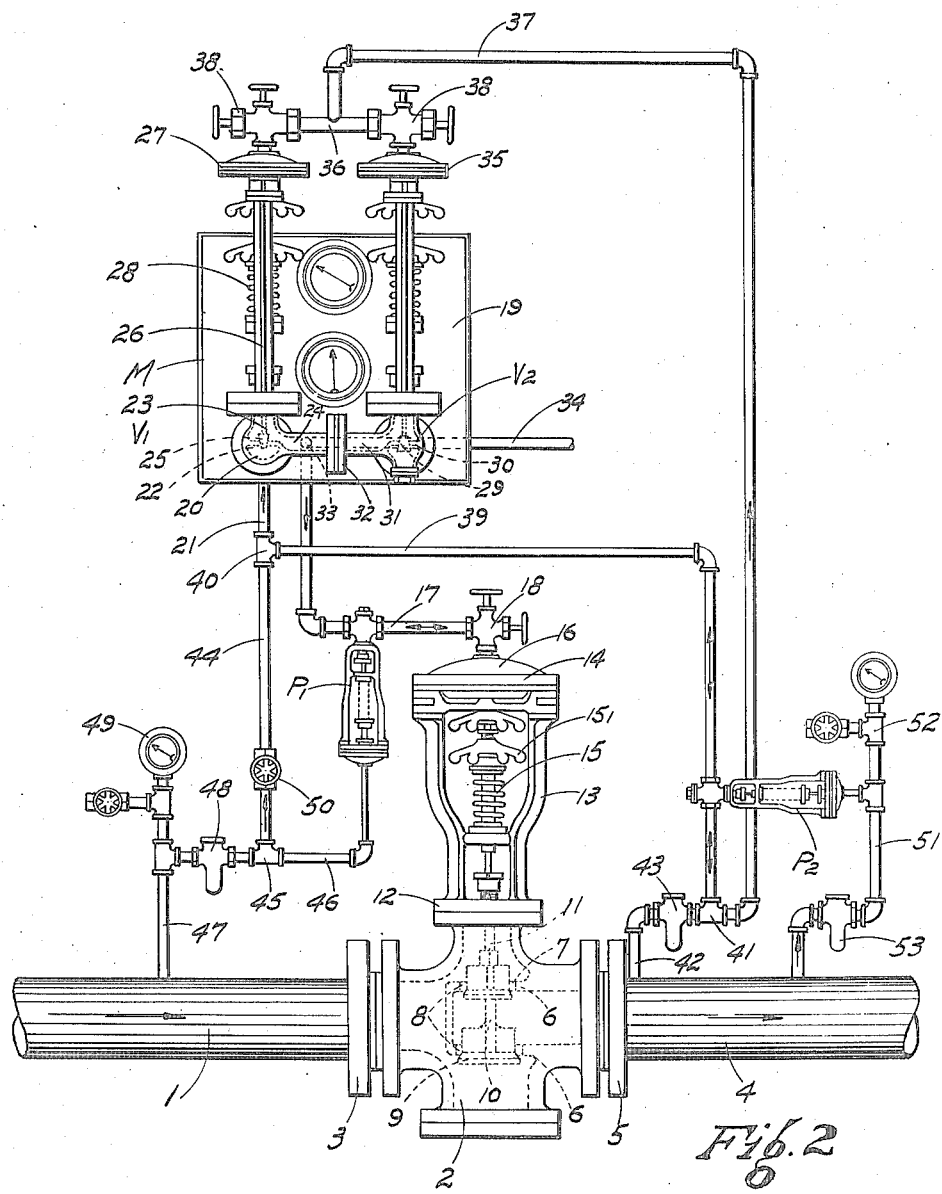

Various other more detailed objects and advantages, such as those associated with rendering the foregoing reducing operations automatic, will in part become apparent, and in part be hereinafter stated as the description of the invention proceeds. For a full and more complete understanding thereof, reference may be had to the following description and accompanying drawings, wherein:

Fig. 1 is a diagrammatic showing of a portion of a system including a plurality of control valves such as provided by this invention; Fig. 2 is a showing somewhat schematic, of a valve and associated mechanism such as provided by this invention; and Fig. 3 is a detailed illustration of one of the pilot valves.

Referring now to the drawings, and particularly Fig. 1, a common header, such as may be included in an extensive heating system is designated X. Supply lines Y and Z are shown as connecting with the header and each of these lines, of course, lead from sources of supply (not shown) of steam under pressure. The pressure of steam provided by the sources of supply is ordinarily in excess of the pressure in the header X and to the end of reducing the pressure of steam as it is fed into the header X, and to close either supply line Y or Z upon reduction of pressure therein, the valves indicated generally as A are provided. It is evident, that if pressure is reduced in the header X both the valves A would close except for the provision of valves B which may be similar to valves A except that the elements for reducing pressure are eliminated. The valves B simply isolate any given portion of the header in which a leak may occur.

Referring more particularly to Figs. 2 and 3, the construction of one of the valve assemblies A will be described. A conduit 1, which in the foregoing illustrative example may be either of the supply lines Y or Z is connected to a valve casing 2 by a joint indicated at 3. Pressure of the fluid therein is comparatively high, for illustrative purposes, say 100 lbs. A second conduit 4 is connected at 5 to the casing 2 and pressure of the fluid in this conduit is for example reduced to about 50 lbs. This conduit 4 is connected to and forms a part of the common header X.

Partitions 6 are formed integral with the casing 2 and have valve openings 7 defined by seats 8. Valve members 9, having guides 10, and carried by a valve stem 11, are designed to be fitted in the seats 8 to close the valve openings 7 and to be removed therefrom to open the latter. The upper portion of the casing 2 is closed by a flanged construction shown at 12 through which extends the stem 11. A frame 13 is connected to the casing 2 by the flanges 12 and at the upper part thereof is provided with a valve operating mechanism in the form of a diaphragm having a housing 14. The stem 11 is connected to the diaphragm to be operated thereby and a spring 15 adjustably compressed to any desired extent by a nut 15' assists in this operation. Fluid is fed into the diaphragm chamber at 16 from a conduit 17 to operate the diaphragm. The pressure of the fluid in the chamber as opposed by the spring pressure positions the valve members 9 with respect to seats 8. A manually operable valve 18 may be located adjacent the diaphragm chamber for arbitrarily throttling the flow or bleeding the line as exigencies may demand.

A pilot valve, referred to generally as $P_1$, and hereinafter described in detail is located in the conduit 17, which extends to and is connected with a master control shown at M. The latter comprises a supporting panel 19 on which are mounted a pair of oppositely disposed valves $V_1$ and $V_2$. The valve $V_1$ has a chamber 20 that is in open communication with a conduit 21. A partition 22 having a valve opening therein separates the chamber 20 from a second chamber 23 which is formed as part of a conduit 24. A valve member 25, mounted on a stem 26 is associated with the partition 22 and opening therein to control the flow of fluid from the conduit 21 to the conduit 24. The stem 26 extends upwardly to a diaphragm operating mechanism indicated at 27. A spring 28 is associated with the stem to cooperate with the diaphragm 27 in operating the valve member 25. It is to be noted that when the member 25 is in its most downward position the opening is closed and that upward movement opens the valve $V_1$.

The valve $V_2$ is a substantial counterpart of the valve V, with the exception that its valve member 29 moves downwardly to open the valve opening in partition 30. Conduit 31 of valve $V_2$ is connected to the conduit 24 as shown at 32 and the conduit 17 is connected at 33 to these two parts of valves $V_1$ and $V_2$. The valve $V_2$ functions to control the passage of fluid from the conduit 31 to a line 34 which exhausts to atmosphere. A diaphragm mechanism 35 controls the operation of the valve member 29 and a manifold serves to establish communication between a conduit 37 and the diaphragm mechanisms 27 and 35. Manually operable valves 38 may be included in the system and are similar to the valve 18. It is apparent that as pressure on diaphragm 27 tends to close the valve $V_1$ the same pressure on diaphragm 35 will open valve $V_2$ to a corresponding extent.

A conduit 39 is connected at 40 to the conduit 21 and this conduit 39 is in turn connected to the conduit 37 at 41. A pilot valve $P_2$, similar in every respect to pilot valve $P_1$, is located in the conduit 39 intermediate the connections 40 and 41. A conduit 42 extends from the connection at 41 to the conduit 4 to which it is connected. A sediment trap 43 may be located in the line 42. A conduit 44 connects the coupling at 40 with another coupling at 45. A line 46 extends from the coupling 45 to the operating diaphragm of the pilot valve $P_1$, while a second line 47 extends from the joint 45 to the conduit 1. A sediment trap 48 may be located in this line which may also be provided with a gauge 49. A hand valve is shown at 50 and it is this valve which is turned on manually to render operative the automatic mechanism herein described. A line 51 having a pressure gauge 52 and trap 53 extends from the conduit 4 to the operating diaphragm of the pilot valve $P_2$.

The pilot valves $P_1$ and $P_2$ are of duplicate construction and one of them is shown in Fig. 3. This valve comprises a casing 54 which is designed to be connected in a line by the threaded joints at 55 and 56. A partition 57 is formed integral in the casing and together with a plug 58 defines a chamber 59. The plug 58 has an opening 60 therein which communicates with the atmosphere while the partition 57 receives a member 61 having an opening therein which, when open, establishes communication in the line connected to the casing at 56 and 55.

A valve member 62, carried by a stem 63 is designed to close either the openings 60 or the opening in member 61. When the opening in member 61 is closed, opening 60 is open and the chamber 59 exhausts to atmosphere and when opening 60 is closed the opening in 61 is open and the line is unrestricted. A frame construction 64 supports a spring arrangement 65 which is associated with the stem and at its outer end structure defining a diaphragm chamber 66. A diaphragm 67 in the latter is connected to the end of stem 63 and operates the latter. A passage 68 admits fluid under pressure to the diaphragm chamber. It is evident that the spring 65 normally urges the valve member 62 into a position closing the opening in the member 61 leaving opening 60 unrestricted. However, when pressure in the chamber 66 is sufficient to overcome spring 65, the member 62 is moved to a position closing the opening 60.

The operation of the foregoing mechanism may be briefly outlined by starting with the valve members 9 closing the openings 7, pressure in the conduit 4 that of atmosphere and pressure in the conduit 1, 100 lbs. The master control has been adjusted to affect the reducing action of the valve so that pressure in the conduit 4 shall be 50 lbs. Also the pilot valves have been adjusted so that the valve members 9 will close the openings 7 when pressure in conduit 1 falls a certain amount beneath 100 lbs. or the pressure in the conduit 4 a certain amount below 50 lbs. It is to be understood that the above noted figures are merely illustrated and taken for the descriptive purposes of this specification.

To start the operation of the device, the hand valve 50 is opened. The fluid under the pressure of that in conduit 1 is admitted to the diaphragm chamber of the pilot valve $P_1$. This pressure serves to overcome that of the spring 65 and the valve member 62 is moved to a position closing the exhaust to atmosphere and establishing communication through the conduit 17. The opening of the valve 50 permits the fluid under pressure to pass through the conduits 44 and 21 to the valve $V_1$ through which it flows to the conduit 17 and through the latter to the diaphragm chamber 14 of the valve A. This pressure on the diaphragm unseats the valve members 9 from the seats 8 and allows fluid to flow through the valve, thereby building up pressure in the conduit 4. The pilot valve $P_2$ has been in a position closing communication in conduit 39, but when pressure in the conduit 4 has built up sufficiently it is transmitted to the diaphragm chamber of valve $P_2$ by the line 51 to operate the valve to close the exhaust to atmosphere and establish communication through line 39. Fluid under the pressure of conduit 4 is then supplied to the conduit 17 through the valve V, and conduits 39 and 21. The valve 50 may then be turned off to leave the valve A under the automatic control of the various mechanisms.

Fluid under the pressure of conduit 4 is supplied to the diaphragm chambers 27 and 35 of valves V1 and V2 of the master control, and a variation of pressure in the conduit 4 will affect these valves V1 and V2 which are very sensitive. It is obvious that as valve V1 closes and valve V2 opens the supply of fluid under pressure to the diaphragm chamber 14 of valve A through the conduit 17 will be diminished, but a closing of valve V2, together with an opening of V1 will increase this pressure. When the machine is first turned on the valve V1 will be open with valve V2 closed but when pressure has been built up in conduit 4 to a desired amount, both these valves V1 and V2 will be open to some extent so that the mechanism will be responsive to small changes of pressure in the conduit 4 to either increase or decrease as the case may be the pressure of the fluid in the diaphragm chamber 14. This arrangement causes the valve A to operate as a reducing valve as any changes in pressure in conduit 4 are promptly effective to vary the opening in valve A to bring the pressure back to the desired point.

Consider now the case when pressure in the conduit 4 falls a substantial distance beneath 50 lbs. to render necessary the closing of the valve A. This reduction will cause operation of the pilot valve P2 to exhaust the conduit 39 to atmosphere at the same time cutting off communication in the conduit 39 at P2. Reduction of pressure in line 39 exhausts the fluid from conduits 21 and 17 and of course the diaphragm chamber 14, whereupon the valve members 9, under the influence of the spring 15 engage the seats A to close the valve A. It is to be remembered that the vave 50 has been closed to discontinue the conduit 1 as a source of supply to the diaphragm chamber 14.

On the other hand, when pressure is reduced in the conduit 1 an appreciable extent below one hundred pounds, the reduction will, of course, also take place in the diaphragm chamber of valve P1 and the latter is therefore operated to exhaust the chamber 14 to the atmosphere at the same time closing the conduit 17 from the side connecting the valve to valves V1 and V2. The reduction in chamber 14 closes the valve A although the pressure in conduit 4 may be maintained at a desired point from other sources.

While a preferred specific embodiment of the invention is herein set forth it is to be understood that I am not to be limited to the exact constructions illustrated and described because various modifications of these details may be made in putting the invention into practice within the purview of the appended claims.

I claim:—

1. In mechanism of the class described, the combination with a common header, and a plurality of supply lines connected to the header, of a cut off valve located in each of the supply lines, each of said valves including mechanism for automatically closing the valve upon reduction of pressure on either side thereof below a certain predetermined point, and means associated with each valve to affect the latter to reduce the pressure of fluid coincident with its passage through the valve.

2. The combination with a supply line for fluid under pressure, of a valve controlling the flow of fluid through said line, operating mechanism associated with the valve for automatically closing the same upon reduction in pressure in the supply line on either side of the valve, and means affecting the valve to impart thereto reducing functions whereby the pressure of fluid in the line is reduced as it passes through the valve.

3. A valve assembly comprising a main valve including a valve member, a fluid actuated mechanism for operating the valve member, a master control comprising a pair of reversely acting valves associated with the fluid actuated mechanism to maintain the valve member in position to effect certain reducing functions, and pilot valves also associated with the fluid actuated mechanism for reducing pressure therein upon a reduction in pressure of fluid passing through the main valve.

4. In combination, a conduit and a valve assembly comprising a main valve including a valve member, fluid actuated mechanism for operating the valve member, a separate master control operable in response to pressures in said conduit associated with the fluid actuated mechanism to maintain the valve member in position to effect certain reducing functions, and independent pilot valves affecting the fluid actuated mechanism to automatically close the main valve upon reduction of the pressure of the fluid on either side of the valve.

5. In a valve assembly, the combination with a main valve including a valve member, of a fluid actuated diaphragm for operating the valve member, a supply of fluid under pressure to the diaphragm, and pilot valves adapted to cut off the supply of fluid under pressure to the diaphragm upon reduction in pressure of fluid on either side of the main valve below a certain predetermined point, said main valves also serving as pressure reducing valve.

6. In a valve assembly, the combination with a main valve including a valve member, of a fluid actuated diaphragm for operating the valve member, a supply of fluid under pressure to the diaphragm, a master control operatively associated with the fluid supply for maintaining the valve member in proper position to perform certain predetermined reducing functions, and pilot valves adapted to cut off the supply of fluid under pressure to the diaphragm upon reduction in pressure of fluid on either side of the main valve below a certain predetermined point.

7. A valve assembly comprising a main valve, fluid actuated mechanism controlling the operation of the main valve, supply lines of fluid under pressure for the actuating mechanism, a pilot valve in each supply line, each of said pilot valves being movable into a position establishing communication in the supply line and also into a position cutting off communication and exhausting the actuating mechanism to atmosphere, each of said pilot valves including a flexible diaphragm located in a chamber, and a conduit connecting the diaphragm chamber with the line controlled by the main valve.

8. In a valve assembly, the combination with a main control valve, of fluid operated means for actuating the control valve, a supply of fluid under pressure for said last named means, a pair of valves controlling the pressure of fluid in said supply line, means for automatically operating the pair of valves whereby they are constituted a master control, and a pair of pilot valves for automatically cutting off the fluid supply and exhausting fluid from the actuating means upon reduction of pressure of the fluid in the line controlled by the main valve.

9. Controlling mechanism for valves, comprising in combination, a line having fluid under pressure therein, a valve operating device controlled by the pressure of fluid in the line, a main valve operated thereby, master control valve means for controlling the pressure of fluid in the line, and pilot valves for automatically obstructing the line and exhausting fluid from the valve operating device upon reduction of pressure of the fluid in the line controlled by the main valve.

10. Controlling mechanism for valves, comprising in combination, a line having fluid under pressure therein, a valve operating device controlled by the pressure of fluid in the line, a main valve operated thereby, master control valve means for controlling the pressure of fluid in the line, a pair of pilot valves located in the line, and means for automatically operating either one of the pilot valves.

11. A valve assembly comprising a main valve, fluid actuated mechanism controlling the operation of the main valve, supply lines of fluid under pressure for the actuating mechanism, a master control for the main valve which is separate therefrom and comprises a pair of reversely acting valves which serve to control the pressure of fluid in the supply lines, a pilot valve in each supply line, each of said pilot valves being movable into a position establishing communication in its supply line and also into a position cutting off communication and exhausting the actuating mechanism to atmosphere, each of said pilot valves including a flexible diaphragm located in a chamber, and a conduit connecting the diaphragm chamber with the line controlled by the main valve.

12. In combination, a conduit and a valve assembly associated therewith, said conduit being adapted to have a condition of high pressure existing on one side of said valve and a condition of low pressure existing on the other side of said valve, said valve comprising a valve member, fluid actuating mechanism for operating said valve member, a separate master control operable in response to pressures in said conduit associated with the fluid actuated mechanism to maintain the valve member in position to effect certain reducing functions, and independent pilot valves affecting the fluid actuated mechanism to automatically close the main valve upon reduction of the pressure of the fluid on the high pressure side of the valve.

13. A valve assembly comprising a main valve, fluid actuated mechanism for controlling the operation of the main valve, supply lines containing fluid under pressure for the actuating mechanism, a master control for the main valve separate therefrom and comprising a pair of reversely acting valves controlling the pressure of fluid in the supply lines and including a flexible diaphragm, a diaphragm chamber and means communicating with said diaphragm chamber and at least one of said supply lines of fluid under pressure, a pilot valve in at least one of said supply lines, said pilot valve being movable into a position establishing communication in its supply line and also into a position cutting off communication and exhausting the actuating mechanism to atmosphere, said pilot valve including a flexible diaphragm located in a chamber, and a conduit connecting the diaphragm chamber with the line controlled by the main valve.

HENRY J. MASTENBROOK.